Sept. 12, 1933.  G. STINSON ET AL  1,926,602
WHEEL CONSTRUCTION
Filed Feb. 9, 1931

Inventors.
George Stinson
Selim Fred.
By Geo. H. Kennedy Jr. Attorney

Patented Sept. 12, 1933

1,926,602

UNITED STATES PATENT OFFICE 1,926,602

WHEEL CONSTRUCTION

George Stinson and Selim Fred, Gardner, Mass., assignors to Heywood-Wakefield Company, Boston, Mass., a corporation of Massachusetts Application February 9, 1931. Serial No. 514,646

3 Claims. (Cl. 301—121)

The present invention relates to devices employed for detachably retaining a vehicle wheel on its axle. The invention is especially applicable to the wheels of baby carriages, go-carts, and the like, wherein it is common practice to provide the axle, near each end, with a latch member, adapted to engage a flange on the hub of the wheel, in order to restrain any endwise movement of the wheel when it is in place on the axle.

Heretofore, in the long-continued use of a wheel so mounted and held, the frictional contact between the rotating hub flange and the relatively stationary latch has resulted in excessive wear of these parts, with consequent increasing endwise play of the wheel on the axle, which is highly objectionable in the operation and use of the carriage or vehicle. Eventually, either the hub flange, or the overhanging shoulder of the latch member, is worn completely away,—this requiring the complete replacement either of the wheel or of the latch, as the case may be. According to the present invention, the above described difficulties are overcome by a construction which eliminates all wear between the latch and the hub. Other and further objects and advantages of the invention will appear from the following detailed description thereof, reference being had in this connection to the accompanying drawing, wherein—

Like reference characters refer to like parts in the different figures.

Figure 1:
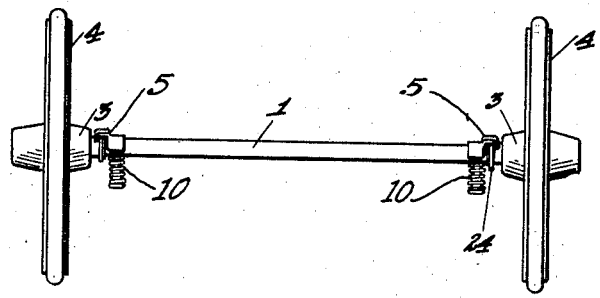
Fig. 1 is a view in elevation of the axle and attached wheels of a go-cart or baby carriage, showing the use of the invention.

The numeral 1 indicates the usual dead axle of a baby carriage or go-cart, said axle being preferably square in cross section intermediate of its ends, while the wheel-receiving ends thereof are preferably turned down to a cylindrical form, as indicated at 2, to provide a trunnion for the rotative support and mounting of a hollow hub 3 of each wheel 4. A latching device 5, of substantially the usual construction, is provided near each end of the axle; such device, as shown, comprises a plate 6 mounted transversely on the upper surface of the axle's squared section and providing side flanges 7, 7 embracing the sides of said squared section; secured to said plate is a stem 8, which passes slidably through a hole 9 in said axle and projects beyond the under side of the axle to receive a compression spring 10, the latter being retained by a head 11 on said stem. The plate 6, so movably attached to the axle, provides an over-hanging outward extension 12, from which depends a downwardly turned latching lip or flange 13, whose lower edge is preferably concavely curved, as shown at 14. By this construction, it will be seen that the latching member 5 provides, in spaced relation to the cylindrical axle portion 2, a downwardly facing shallow channel 15, in which to receive a portion or flange of the wheel hub, so as to hold the wheel against endwise movement.

According to the present invention, the wheel hub 3 which fits the cylindrical portion 2 is of special construction, at its inner end adjacent the latch 5. The hub 3 has a hollow cylindrical bearing element 17 extending therethrough and projecting inwardly therefrom, the inner surface of the element 17 providing the rotative mounting of the wheel on the trunnion portion 2 of the axle. The element 17 is secured against rotation within the hub 3 in any suitable manner as by spreading or turning over of the inner end of said element against the inner surface of the hub. An annular sleeve 19 is firmly secured on element 17 by the outwardly flared end 20 of the element 17 which clamps said sleeve against the inner end of the hub 3. A circumferential groove 22 is formed in the outer surface of the sleeve 19 to provide a raceway for a set of balls 23, 23 which forms a low friction connection between the hub 3 and a flange 24 rotatably mounted thereon. The flange, which is parallel to the plane of the wheel, is arranged to be received in the downwardly facing shallow channel 15 of the latch, to hold the wheel in position on the axle. The flange is formed of a pair of annular members 25 and 26 which are angular in cross section, one leg of each extending parallel to the axis of the wheel, the other leg at right angles thereto, the openings in the members being somewhat larger than the diameter of the member 19 in order to be freely rotatable thereon. The members 25 and 26 interlock and receive between them the balls 23, 23, the outer diameter of the members being such that when in position the balls are held securely in the groove 22, the edges of the member 25 being turned over the angle of the member 26 to prevent separation of said members. In order to hold the flange 24 thus formed against rotation relative to the latch member, a protuberance or projecting portion 27 is formed on the flange by leaving a portion of the edge of the member 25 unturned, and extending outwardly to engage with the side of the latch 5.

Figure 2:
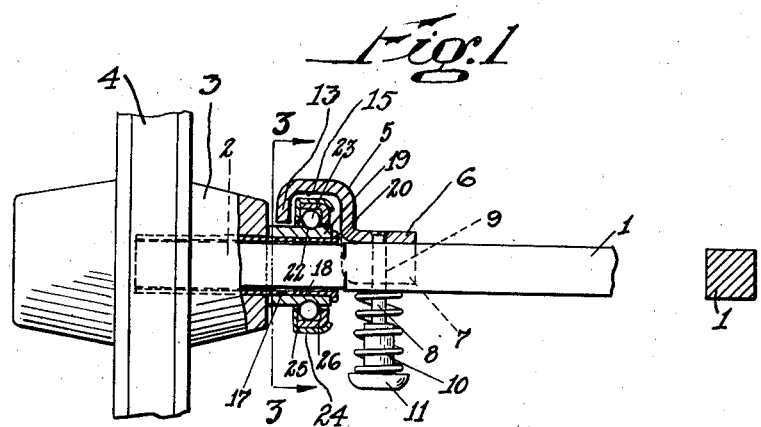
Fig. 2 is an enlarged fragmentary view, partly in section, showing the latch or retainer in operative relation to the hub of a wheel.
Figures 3, 4:
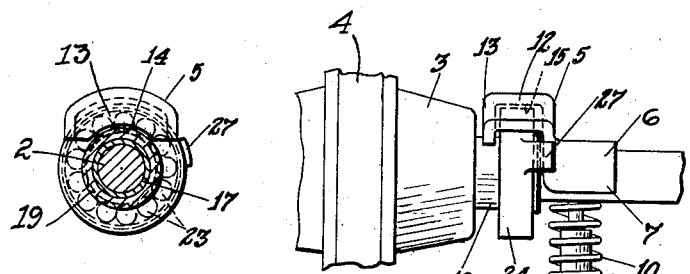
Fig. 3 is a sectional view on the line 3—3 of Fig. 2, looking in the direction of the arrows.
Fig. 4 is a view similar to Fig. 2, with the parts shown in elevation instead of in section.

It will be apparent that the flange 24 thus formed can rotate freely relative to the hub, but will be held against movement axially thereof by the inability of balls 23, 23 to get out of groove 22. When the wheel is in position on the axle as in Fig. 2, with the flange engaging the channel 15 in the latch, the protuberance 27 engages the latch and holds the flange and latch against relative movement although permitting the wheel to rotate. In this way substantially all wear between the flange and the latch is eliminated, the friction being taken up in the ball bearing elements.

We claim,

1. In combination, a stationary axle having a wheel-retaining latch thereon and a wheel on said axle with a flange on the inner side of the hub thereof engageable with said latch and rotatably mounted on said hub, and a protuberance on said flange engageable with a portion of the latch.

2. In combination, an axle having a grooved locking member thereon, a vehicle wheel on said axle having an extension on one side of the hub, a flange rotatably mounted against endwise movement on said extension for engagement with said groove, and a projecting member on said flange for engagement with the locking member.

3. A device of the class described comprising a spring-actuated latch mounted on an axle and having a groove therein, a wheel adapted to be mounted on said axle and having a flange thereon adapted to engage with said groove, said flange being mounted for rotation relative to the wheel and a protuberance on said flange to engage a portion of said latch and hold said flange against rotation.

GEORGE STINSON.
SELIM FRED.